(12) United States Patent
Kajimoto

(10) Patent No.: US 11,188,174 B2
(45) Date of Patent: Nov. 30, 2021

(54) CONTROL APPARATUS

(71) Applicant: DENSO TEN Limited, Kobe (JP)

(72) Inventor: Nobuaki Kajimoto, Kobe (JP)

(73) Assignee: DENSO TEN Limited, Kobe (JP)

( * ) Notice: Subject to any disclaimer, the term of this patent is extended or adjusted under 35 U.S.C. 154(b) by 0 days.

(21) Appl. No.: 16/992,507

(22) Filed: Aug. 13, 2020

(65) Prior Publication Data

US 2021/0132732 A1 May 6, 2021

(30) Foreign Application Priority Data

Oct. 31, 2019 (JP) .............................. JP2019-198739

(51) Int. Cl.
*G06F 3/041* (2006.01)
*G06F 3/045* (2006.01)

(52) U.S. Cl.
CPC ............ *G06F 3/0418* (2013.01); *G06F 3/045* (2013.01)

(58) Field of Classification Search
None
See application file for complete search history.

(56) References Cited

U.S. PATENT DOCUMENTS

2019/0107920 A1* 4/2019 Shimada ............ H03K 17/9645

FOREIGN PATENT DOCUMENTS

JP 2014-174892 A 9/2014

* cited by examiner

*Primary Examiner* — Stephen T. Reed
(74) *Attorney, Agent, or Firm* — Oliff PLC

(57) ABSTRACT

A control apparatus according to an embodiment includes a microcomputer configured to function as a first calibrator and a second calibrator. The first calibrator performs a calibration in a two-point touch in which a number of touch points is two on a resistive film touch panel. The second calibrator performs the calibration in a one-point touch in which the number of the touch points is one based on a set value set by the first calibrator.

6 Claims, 4 Drawing Sheets

CONTROL APPARATUS

BACKGROUND OF THE INVENTION

Field of the Invention

The invention relates to a control apparatus and a calibration method.

Description of the Background Art

Conventionally, in a resistive film type touch panel, there has been a control apparatus that calculates input coordinates indicating a touch position on the touch panel based on an inter-terminal voltage input from the touch panel (for example, refer to Japanese Unexamined Patent Publication No. 2011-123815).

In this type of the control apparatus, generally, a calibration is performed before shipping, and, after shipping, a result of the calibration is reflected to calculate the input coordinates. As a result, it is possible to improve accuracy of the input coordinates.

However, in a conventional technology, the accuracy of the input coordinates may be deteriorated depending on an order of the calibration. Specifically, when the calibration in a one-point touch in which a number of touch points is one is performed prior to the calibration in a two-point touch in which the number of the touch points is two, the input coordinates in the one-point touch may be shifted after the calibration in the two-point touch.

More specifically, if the calibration in the two-point touch is performed after the calibration in the one-point touch has been performed, parameters used in the calibration in the one-point touch are rewritten.

SUMMARY OF THE INVENTION

According to one aspect of the invention, a control apparatus includes a microcomputer configured to function as a first calibrator that performs a calibration in a two-point touch in which a number of touch points is two on a resistive film touch panel and a second calibrator that performs the calibration in a one-point touch in which the number of the touch points is one based on a set value set by the first calibrator.

It is an object of the invention to provide a control apparatus and a calibration method capable of appropriately performing a calibration.

These and other objects, features, aspects and advantages of the invention will become more apparent from the following detailed description of the invention when taken in conjunction with the accompanying drawings.

DESCRIPTION OF THE EMBODIMENTS

A control apparatus and a calibration method according to an embodiment will now be described with reference to the accompanying drawings. This invention is not limited to the embodiment described in the following.

Figure 1A:
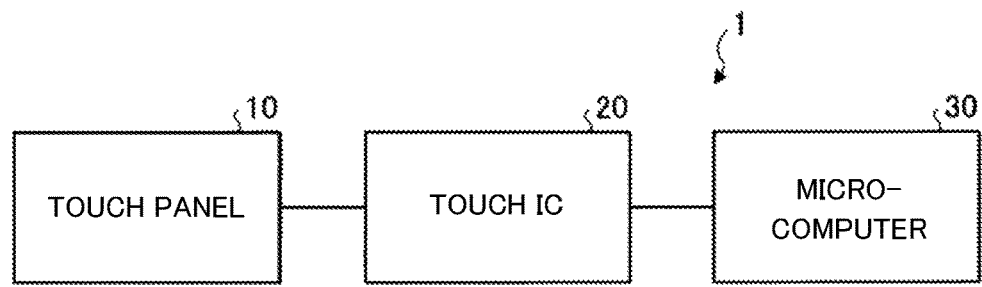
FIG. 1A illustrates a configuration example of an input system.
Figure 1B:
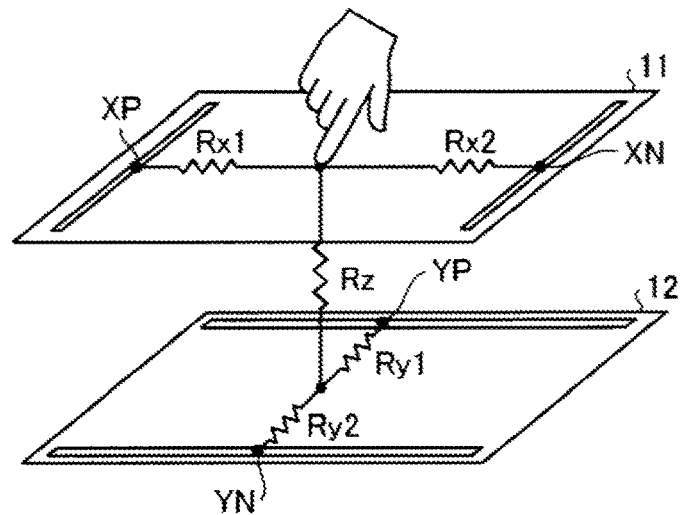
FIG. 1B illustrates an overview of a touch panel.
Figure 1C:
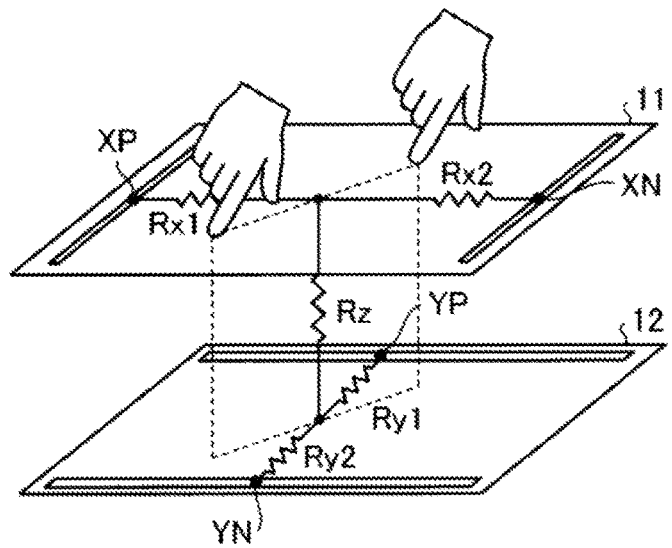
FIG. 1C illustrates the overview of the touch panel.
Figure 1D:
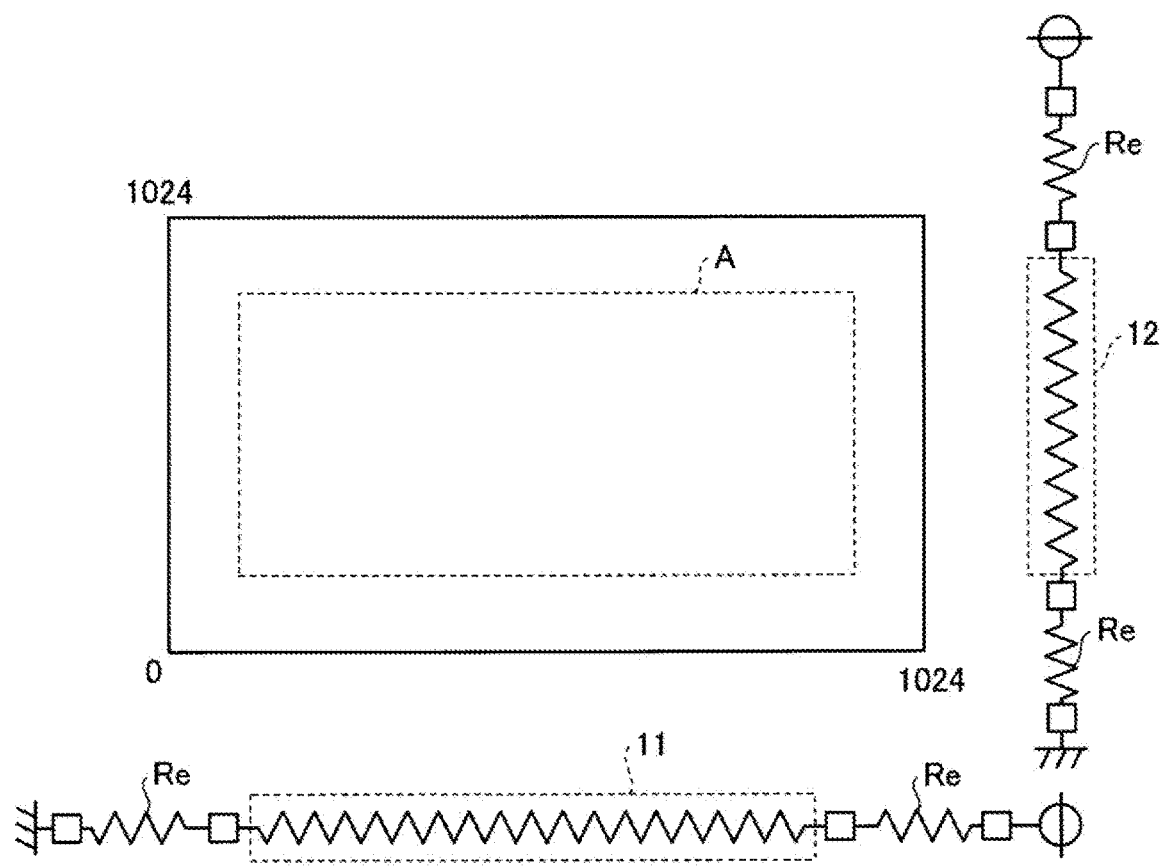
FIG. 1D is a schematic diagram of a resistive film.
Figure 1E:
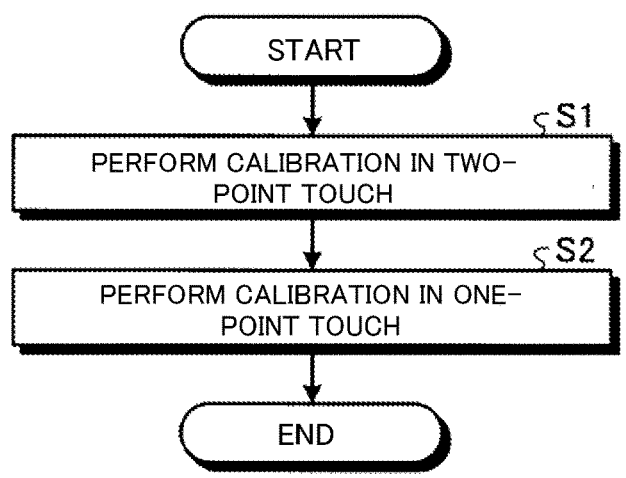
FIG. 1E is a flowchart illustrating an overview of a calibration method.

First, an overview of the control apparatus and the calibration method according to this embodiment will be described with reference to FIG. 1A to FIG. 1E. FIG. 1A illustrates a configuration example of an input system. Each of FIG. 1B and FIG. 1C illustrates an overview of a touch panel. FIG. 1D is a schematic diagram of a resistive film. FIG. 1E is a flowchart illustrating an overview of the calibration method. The calibration method according to this embodiment is executed by a microcomputer 30 based on output results of a touch panel 10 and a touch IC 20 shown in FIG. 1A.

As illustrated in FIG. 1A, an input system 1 according to the embodiment includes the touch panel 10, the touch IC 20 and the microcomputer 30. The touch panel 10 is a resistive film touch panel. As illustrated in FIG. 1B, the touch panel 10 has a first resistive film 11 and a second resistive film 12.

For example, the first resistive film 11 detects an input coordinate of an X-axis coordinate in the touch panel 10, and the second resistive film 12 detects an input coordinate of a Y-axis coordinate in the touch panel 10. In an example shown in FIG. 1B, there is a resistance Rz between the first resistive film 11 and the second resistive film 12.

Figure 2:
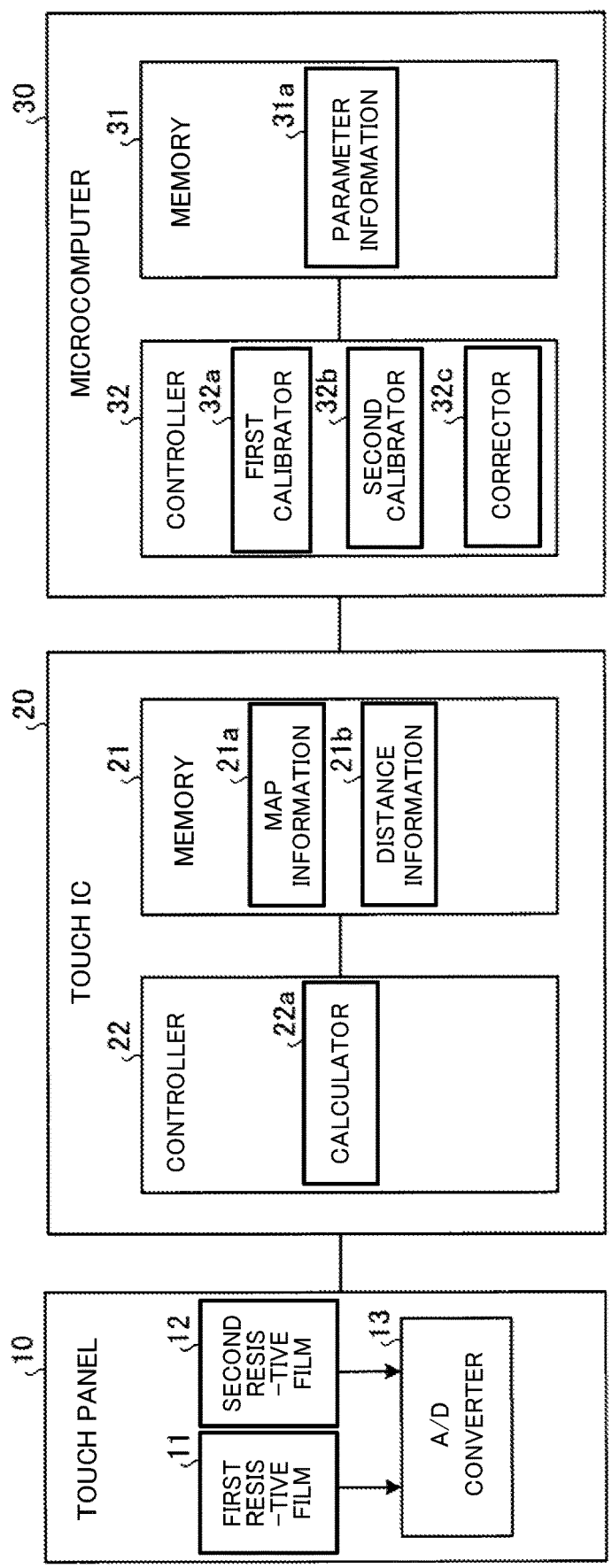
FIG. 2 is a block diagram of an input system.

The touch panel 10 has an operation surface (not shown) and an A/D converter 13 (refer to FIG. 2). When the operation surface is pressed, an inter-terminal voltage of each of the first resistive film 11 and the second resistive film 12 is A/D converted, and the A/D converted value (hereinafter, just referred to as "conversion value") is output to the touch IC 20.

The touch IC 20 shown in FIG. 1A calculates the input coordinates corresponding to a touch position based on the conversion value input from the touch panel 10. The input coordinates calculated by the touch IC 20 is input to the microcomputer 30.

The microcomputer 30 shown in FIG. 1A is one example of the control apparatus. For example, the microcomputer 30 performs a calibration before shipping and corrects the input coordinates based on an adjustment value adjusted by the calibration.

Here, a basic principle of the resistive film touch panel 10 will be briefly described with reference to FIG. 1B and FIG. 1C. In the resistive film touch panel 10, the input coordinates corresponding to the touch position are calculated by a change in the inter-terminal voltage of each of the first resistive film 11 and the second resistive film 12, that is, a change in a resistance of each resistive film.

Specifically, as illustrated in FIG. 1B, for example, in a one-point touch in which a number of touch points is one, if an inter-terminal resistance between terminals XP and XN is an inter-terminal resistance value Rx, the formula is expressed by "Rx=Rx1+Rx2". In this case, if an inter-terminal resistance between terminals YP and YN is an inter-terminal resistance value Ry, the formula is expressed by "Ry=Ry1+Ry2.

Thus, in the one-point touch, the touch IC 20 calculates the input coordinates indicating the touch position based on the change in the inter-terminal voltage. In a two-point touch in which the number of the touch points is two, as a distance between two points of touch becomes longer, a number of the resistances that are connected in parallel in each of the first resistive film 11 and the second resistive film 12 increases. In other words, as the distance between the two points of touch becomes longer, the inter-terminal resistance decreases.

Therefore, in the two-point touch, the touch IC 20 calculates the distance between the two points of touch based on distance information indicating a relationship between the distance between the two points of touch and the inter-terminal resistance, and calculates the input coordinates of each touch position.

Here, in the input system 1 according to this embodiment, by further providing a resistance (hereinafter, referred to as "external resistance") that is externally connected to the touch panel 10, it is possible to improve resistance to noise caused by static electricity.

Specifically, as illustrated in FIG. 1D, for example, external resistances Re are provided at both ends of each of the first resistive film 11 and the second resistive film 12. For example, it is assumed that each of the external resistances Re is 100Ω, while a total sum of resistance values of the first resistive film 11 is 800 Ω and the total sum of the resistance values of the second resistive film 12 is 300Ω.

Here, when a resistance value of each of the external resistances Re is sufficiently small, even if the input coordinates are calculated by neglecting the external resistances Re, the external resistances Re have little influence on the input coordinates. That is, when the resistance value of each of the external resistances Re is sufficiently small, the input coordinates are calculated without considering the external resistances Re.

On the other hand, as the resistance value of each of the external resistances Re increases, correction of the input coordinates is required. Specifically, the conversion value described above includes the resistance value of each of the external resistances Re, and the input coordinates calculated based on such a conversion value are shifted by an amount of the external resistances Re relative to actual input coordinates.

When the resistance value of each of the external resistances Re is sufficiently large, as illustrated in FIG. 1D, since an area in which the input coordinates are calculated is limited, it is necessary to provide an effective area A to the conversion value obtained by A/D converting a value of the inter-terminal voltage.

Here, the effective area A is smaller than a whole range of the conversion values (0 to 1024 in an example shown in FIG. 1D), and is obtained by excluding a range corresponding to the resistance values of the external resistances Re from the whole range described above. In other words, the effective area A is an area in which the input coordinates indicating the touch position are calculated.

Here, in the one-point touch, appropriate input coordinates are derived by correcting the input coordinates calculated based on the inter-terminal voltage using the resistance values of the external resistances Re. Such coordinate correction is performed, for example, based on a total resistance value as the total sum of the resistance values of an interior of the touch panel 10 that is generated in the one-point touch.

In this case, in order to calculate the total resistance value, parameters need to be set beforehand by the calibration. The calibration is performed in both the one-point touch and the two-point touch.

If the calibration in the two-point touch is performed after the calibration in the one-point touch has been performed, the parameters used in the calibration in the one-point touch are rewritten.

As a result, after the calibration in the two-point touch has ended, the input coordinates in the one-point touch are shifted. In this case, the calibration in the one-point touch needs to be performed again so that the calibration becomes complicated.

Thus, in the calibration method according to the embodiment, the calibration in the two-point touch is performed prior to the calibration in the one-point touch. Specifically, as illustrated in FIG. 1E, in the calibration method according to the embodiment, the calibration in the two-point touch is first performed (a step S1). Subsequently, the calibration in the one-point touch is performed (a step S2).

As a result, in the calibration method according to the embodiment, it is possible to perform the calibration in the one-point touch using the parameters set in the calibration in the two-point touch.

That is, in the calibration method according to the embodiment, by performing the calibration in the one-point touch using the parameters set in the calibration in the two-point touch, it is possible to set appropriate parameters for each of the two-point touch and the one-point touch. Therefore, according to the calibration method according to the embodiment, it is possible to appropriately perform the calibration.

Next, a configuration example of the input system 1 according to the embodiment will be described with reference to FIG. 2. FIG. 2 is a block diagram of the input system 1. First, the touch panel 10 will be described. As illustrated in FIG. 2, the touch panel 10 includes the first resistive film 11, the second resistive film 12 and the A/D converter 13.

The first resistive film 11 has terminals of a pair of electrodes along an X-axis direction of the touch panel 10. The second resistive film 12 has terminals of a pair of electrodes along a Y-axis direction of the touch panel 10. The inter-terminal voltage that is detected by each set of the terminals is output to the A/D converter 13 via each of the external resistances Re.

The A/D converter 13 converts the inter-terminal voltage as an analog voltage that is input from each of the first resistive film 11 and the second resistive film 12 into the conversion value as a digital value. That is, the A/D converter 13 converts the inter-terminal voltage into a numerical value according to a level (strength) of the inter-terminal voltage. Furthermore, the conversion value converted by the A/D converter 13 is output to the touch IC 20.

Subsequently, the touch IC 20 will be described. As illustrated in FIG. 2, the touch IC 20 includes a memory 21 and a controller 22. The memory 21 is, for example, implemented by semiconductor memory elements such as a RAM (Random Access Memory) and a flash memory, or storage devices such as a hard disk and an optical disk. In an example shown in FIG. 2, the memory 21 stores map information 21a and distance information 21b.

The map information 21a relates to a map indicating a relationship between the conversion value of the inter-terminal voltage and each set of the input coordinates. In the example described above, the conversion value takes a value of 0 to 1024 for each of an X axis and a Y-axis, and the map indicating the input coordinates represented by each numerical value is stored in the memory 21 as the map information 21a. The distance information 21b indicates the relationship between the distance between the two points of touch in the two-point touch and the inter-terminal resistance.

Subsequently, the controller 22 will be described. The controller 22, for example, a CPU, an MPU, or the like, uses the RAM as a work area to execute various programs stored in the memory 21. The controller 22 is implemented by executing these programs. The controller 22 is, for example, implemented by an integrated circuit such as an ASIC, an FPGA, or the like.

Furthermore, as illustrated in FIG. 2, the controller 22 includes a calculator 22a. The calculator 22a calculates the input coordinates indicating the touch position based on the digital conversion value converted by the A/D converter 13.

Specifically, in the one-point touch, the calculator 22a refers to the map information 21a, and calculates the input coordinates corresponding to the conversion value. That is, the calculator 22a calculates the X-axis coordinate of the input coordinates based on the inter-terminal voltage of the first resistive film 11, and calculates the Y-axis coordinate of the input coordinates based on the inter-terminal voltage of the second resistive film 12.

In the two-point touch, the calculator 22a calculates barycentric coordinates of the two points of touch and refers to the distance information 21b so as to calculate the distance between the two points of touch from the inter-terminal resistance value.

Subsequently, the calculator 22a performs ghost removal based on the barycentric coordinates and the distance between the two points of touch, and calculates the input coordinates of each of the two points of touch. After the calculator 22a has performed the ghost removal, the calculator 22a calculates the input coordinates corresponding to each of the two points of touch. The input coordinates calculated by the calculator 22a are input to the microcomputer 30.

Referring back to FIG. 2, the microcomputer 30 will be described. As illustrated in FIG. 2, the microcomputer 30 includes the memory 31 and the controller 32. The memory 31 is, for example, implemented by semiconductor memory elements such as a RAM (Random Access Memory) and a flash memory, or storage devices such as a hard disk and an optical disk. In the example shown in FIG. 2, the memory 31 stores parameter information 31a.

The parameter information 31a relates to various types of parameters that are used when calculating the total resistance value. A part or all of the various types of the parameters are rewritten by the controller 32 before shipping or when a power supply is started.

Subsequently, the controller 32 will be described. The controller 32, for example, a CPU, an MPU, or the like, uses the RAM as a work area to execute various programs stored in the memory 31. The controller 22 is implemented by executing these programs. The controller 32 is, for example, implemented by an integrated circuit such as an ASIC, an FPGA, or the like.

As illustrated in FIG. 2, the controller 32 includes a first calibrator 32a, a second calibrator 32b, and a corrector 32c. The first calibrator 32a performs the calibration in the two-point touch in which the number of the touch points is two on the resistive film touch panel.

For example, the first calibrator 32a sets the parameters that are used when calculating the total resistance value in the calibration in the two-point touch. Such parameters include a gain parameter and a coordinate parameter.

Figure 3:
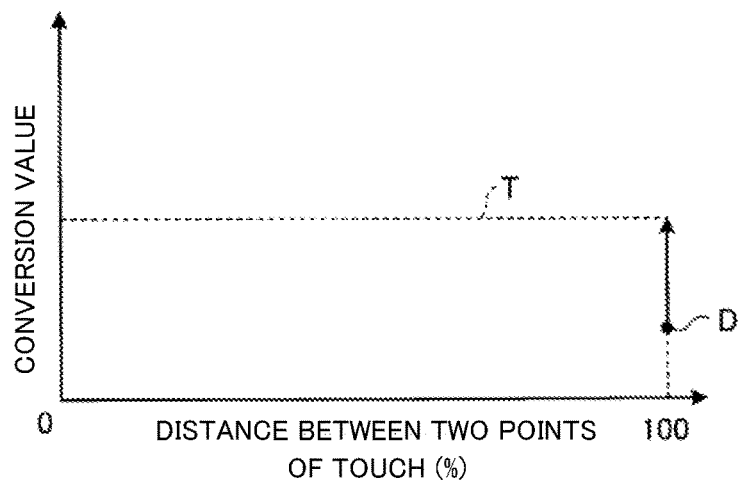
FIG. 3 is an explanatory diagram of a gain parameter.

Here, an overview of the gain parameter will be described with reference to FIG. 3. FIG. 3 is an explanatory diagram of the gain parameter. In FIG. 3, a vertical axis indicates the conversion value of the inter-terminal voltage and a horizontal axis indicates the distance between the two points of touch. The distance between the two points of touch means the distance between the respective touch positions in the two-point touch.

The first calibrator 32a sets a reference conversion value obtained by A/D converting the inter-terminal voltage of the touch panel 10 when the distance between the two points of touch is used as a reference distance to a target value. In an example shown in FIG. 3, the reference distance, that is, the distance between the two points of touch is 100% (from an end to the other end of the touch panel 10) and the conversion value when the distance between the two points of touch is 100% becomes a reference conversion value D.

When the reference conversion value D is shifted from a target value T, the first calibrator 32a sets a coefficient for setting the reference conversion value D to the target value T as the gain parameter. That is, the gains parameter corrects a shift of the reference conversion value D with respect to the target value T.

The first calibrator 32a sets the coordinate parameter for adjusting a shift of the input coordinates with respect to the conversion value obtained by A/D converting the inter-terminal voltage of the touch panel 10. For example, the coordinate parameter corrects a slight shift of the input coordinates with respect to the inter-terminal voltage and is set when setting the gain parameter.

Referring back to FIG. 2, the second calibrator 32b will be described. The second calibrator 32b performs the calibration in the one-point touch in which the number of the touch points is one based on a set value set by the first calibrator 32a.

The calibration by the second calibrator 32b is performed using the gain parameter and the coordinate parameter set by the first calibrator 32a. Specifically, the second calibrator 32b first calculates the total resistance value using the various types of the parameters including the gain parameter and the coordinate parameter and each conversion value.

The second calibrator 32b corrects each set of the input coordinates represented by the conversion values when pressing 16 reference positions predetermined on the touch panel 10 based on the calculated total resistance value.

That is, the second calibrator 32b performs the calibration so that each of the reference positions corresponds to each set of the input coordinates calculated from the inter-terminal voltage. In this case, the second calibrator 32b calculates the total resistance value using the parameters set in the calibration in the two-point touch performed by the first calibrator 32a.

Therefore, the second calibrator 32b accurately calculates the total resistance value and improves accuracy of the calibration in the one-point touch. Furthermore, in the microcomputer 30 according to this embodiment, the second calibrator 32b performs the calibration after the first calibrator 32a has performed the calibration.

As a result, since the parameters used for calculating the total resistance value in the calibration in the one-point touch are not rewritten by the first calibrator 32a, after the calibration in the one-point touch, it is possible to prevent the shift of the input coordinates in the one-point touch due to rewriting of the parameters.

Subsequently, the corrector 32c will be described. After shipping, that is, at an actual use, the corrector 32c corrects the input coordinates using various types of the parameters set in the calibrations performed by the first calibrator 32a and the second calibrator 32b.

For example, in the one-point touch, the corrector 32c calculates the total resistance value described above and applies the total resistance value to the coordinate correction of the input coordinates. That is, a shift amount based on the external resistances R from the input coordinates calculated by the touch IC 20 is corrected.

In the two-point touch, the corrector 32c skips the coordinate correction based on the total resistance value. This is because, in the two-point touch, each set of the input coordinates is calculated by considering the external resistances Re beforehand. If the corrector 32c, in the two-point touch, performs the coordinate correction based on the total resistance value, each set of the input coordinates is shifted outward from each set of the actual input coordinates in the touch panel 10 by the amount of the external resistances Re.

As described above, the corrector 32c performs the coordinate correction different between the one-point touch and the two-point touch so as to improve the accuracy of the input coordinates in both the one-point touch and the two-point touch.

Figure 4:
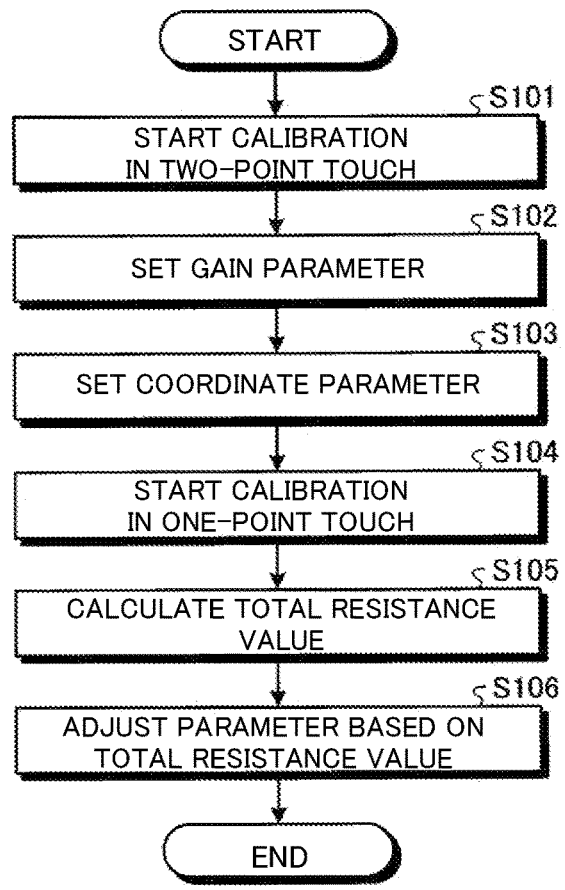
FIG. 4 is a flowchart illustrating a processing procedure executed by a microcomputer.

Next, a processing procedure executed by the microcomputer 30 according to the embodiment will be described with reference to FIG. 4. FIG. 4 is a flowchart illustrating the processing procedure executed by the microcomputer 30. The processing procedure shown below is executed by the controller 32 of the microcomputer 30, for example, before shipping.

As illustrated in FIG. 4, the microcomputer 30 starts the calibration in the two-point touch (a step S101) and sets the gain parameter (a step S102). Subsequently, the microcomputer 30 sets the coordinate parameter (a step S103). The calibration in the two-point touch is ended through the step S103.

Subsequently, the microcomputer 30 starts the calibration in the one-point touch (a step S104) and calculates the total resistance value based on the gain parameter set in the step S102 and the coordinate parameter set in the step S103 (a step S105).

Then, the microcomputer 30 adjusts the parameters based on the total resistance value (a step S106) and ends the process.

As described above, the microcomputer 30 according to the embodiment (one example of the control apparatus) includes the first calibrator 32a and the second calibrator 32b. The first calibrator 32a performs the calibration in the two-point touch in which the number of the touch points is two on the resistive film touch panel 10. The second calibrator 32b performs the calibration in the one-point touch in which the number of the touch points is one based on the set value set by the first calibrator 32a. Therefore, according to the microcomputer 30 according to the embodiment, it is possible to appropriately perform the calibration.

By the way, in the embodiment described above, a case in which the touch panel 10, the touch IC 20 and the microcomputer 30 are separately configured has been described, but the touch panel 10, the touch IC 20 and the microcomputer 30 may be integrated or dispersed appropriately. In this case, for example, the first calibrator 32a and the second calibrator 32b may be provided in hardware dedicated for the calibration.

It is possible for a person skilled in the art to easily come up with more effects and modifications. Thus, a broader modification of this invention is not limited to specific description and typical embodiments described and expressed above. Therefore, various modifications are possible without departing from the general spirit and scope of the invention defined by claims attached and equivalents thereof.

While the invention has been shown and described in detail, the foregoing description is in all aspects illustrative and not restrictive. It is therefore understood that numerous other modifications and variations can be devised without departing from the scope of the invention.

What is claimed is:

1. A control apparatus comprising a microcomputer configured to function as:
   a first calibrator that performs a calibration in a two-point touch in which a number of touch points is two on a resistive film touch panel; and
   a second calibrator that performs the calibration in a one-point touch in which the number of the touch points is one, after the first calibrator performs the calibration in the two-point touch, based on a set value set by the first calibrator, wherein
   the second calibrator calculates a total resistance value as a total sum of resistance values of a resistive film of the touch panel and an external resistance attached in series to the resistive film that is generated in the touch on the touch panel, and performs the calibration in the one-point touch based on the total resistance value, and
   the first calibrator sets, as the set value, parameters that are used by the second calibrator to calculate the total resistance value.

2. The control apparatus according to claim 1, wherein
   the first calibrator sets a gain parameter for setting a reference conversion value obtained by A/D converting an inter-terminal voltage of the touch panel when a distance between two points of touch is used as a reference distance to a target value, and the second calibrator uses the gain parameter as the set value to calculate the total resistance value.

3. The control apparatus according to claim 2, wherein
   the first calibrator further sets a coordinate parameter for adjusting a shift of input coordinates corresponding to the reference conversion value obtained by A/D converting the inter-terminal voltage of the touch panel, and the second calibrator uses the coordinate parameter as the set value to calculate the total resistance value.

4. A calibration method comprising the steps of:
   (a) performing, by a microcomputer, a calibration in a two-point touch in which a number of touch points is two on a resistive film touch panel; and
   (b) performing, by the microcomputer, the calibration in a one-point touch in which the number of the touch points is one, after performing the calibration in the two-point touch, based on a set value set by the step (a), wherein
   the step (b) calculates a total resistance value as a total sum of resistance values of a resistive film of the touch panel and an external resistance attached in series to the resistive film that is generated in the touch on the touch panel, and performs the calibration in the one-point touch based on the total resistance value, and
   the step (a) sets, as the set value, parameters that are used by the step (b) to calculate the total resistance value.

5. The calibration method according to claim 4, wherein
   the step (a) sets a gain parameter for setting a reference conversion value obtained by A/D converting an inter-terminal voltage of the touch panel when a distance between two points of touch is used as a reference distance to a target value, and the step (b) uses the gain parameter as the set value to calculate the total resistance value.

6. The calibration method according to claim 5, wherein
   the step (a) further sets a coordinate parameter for adjusting a shift of input coordinates corresponding to the reference conversion value obtained by A/D converting the inter-terminal voltage of the touch panel, and the step (b) uses the coordinate parameter as the set value to calculate the total resistance value.

\* \* \* \* \*